(12) United States Patent
Isogaya

(10) Patent No.: US 6,579,559 B2
(45) Date of Patent: Jun. 17, 2003

(54) SURFACE TREATING METHOD OF POLISHED RICE

(75) Inventor: Keiichi Isogaya, Shizuoka (JP)

(73) Assignee: Ochi International Co., Ltd., Shizuoka-ken (JP)

( * ) Notice: Subject to any disclaimer, the term of this patent is extended or adjusted under 35 U.S.C. 154(b) by 154 days.

(21) Appl. No.: 09/818,101

(22) Filed: Mar. 27, 2001

(65) Prior Publication Data
US 2002/0142090 A1 Oct. 3, 2002

(51) Int. Cl.[7] .............................................. A23L 1/182
(52) U.S. Cl. ........................ 426/618; 426/520; 426/578
(58) Field of Search ................................ 426/618, 520, 426/578

(56) References Cited
U.S. PATENT DOCUMENTS
4,765,996 A * 8/1988 Misaki et al. ................. 426/72

FOREIGN PATENT DOCUMENTS
JP 04190750 * 7/1992

* cited by examiner

Primary Examiner—Helen Pratt
(74) Attorney, Agent, or Firm—Zito tlp; Joseph J. Zito

(57) ABSTRACT

The invention provides a treating method of forming a protection layer having strong abrasion resistance and oxidation resistance and having a thickness of micron order of a surface of a polished grain or a processed granular material obtained by kneading and solidifying a starch so as to make it hard to be changed in quality, thereby improving a storage capacity for a long time. Further, the invention provides a treating method of forming a fine particulate starch attached to the grain or the granular material into a paste state so as to combine with the protection layer. The surface treating method has a step of applying a high humidity hot wind to the polished grain or the granular material so as to heat a surface layer portion, a step of forming a starch in the heated portion into a paste state and further making the starch into an alpha state, and a step of cooling and forming a fine layer of the alpha starch on the surface portion.

1 Claim, 2 Drawing Sheets

SURFACE TREATING METHOD OF POLISHED RICE

BACKGROUND OF THE INVENTION

1. Field of the Invention

The present invention relates to a surface treating method of a granular material formed by polishing a rice, a barley, a Japanese millet, a foxtail millet, an adlay, or the other grains, or kneading and solidifying a starch such as a tapioca.

2. Description of the Prior Art

In the rice, the barley, the Japanese millet, the foxtail millet, the adlay, or the other grains, a "bran" or the like attached to a surface thereof or forming a part of the surface is removed by polishing prior to being served as a food. Further, a miscellaneous grain crop, a corm or the like is once formed into fine particles so as to be made a dry starch, and thereafter is kneaded and solidified, thereby being processed to a granular material having a fixed size such as the tapioca.

Since the polished grains or the processed granular materials mentioned above mainly contain a starch, an entrained component such as a fat and an oil or the like oozes out and an oxygen, a moisture or the like enters into an internal portion, whereby the polished grains or the processed granular materials change in quality. Accordingly, these materials are not proper to be kept or stored for a long time.

For example, with respect to the rice, there is performed a method of removing a bran component on the surface and an aleurone layer by polishing a brown rice so as to obtain a polished rice and further removing a skin bran by brushing it so as to obtain a milled rice.

Since the polished rice has less bran component and aleurone layer in comparison with the brown rice, the polished rice less changes in quality, so that the taste thereof is deteriorated at a lower degree during the storage within a given period.

However, on the contrary, since the polished rice is not covered with the bran component or the aleurone layer, the oil and fat easily oozes out to the surface at that degree and the oxygen, the moisture or the like easily enters into the internal portion, so that there is a problem the polished rice is easily oxidized and changes in quality, thereby being improper to be kept or stored for a long period.

SUMMARY OF THE INVENTION

An object of the present invention is to provide a treating method of forming a protection layer having strong abrasion resistance and oxidation resistance and having a thickness of micron order of a surface of a polished grain or a processed granular material so as to make it hard to be changed in quality, thereby improving a storage capacity for a long time.

Further, another object of the present invention is to provide a treating method of forming fine particulate starches attached to the grain or the granular material into a paste state so as to combine with the protection layer.

The prevent invention solves the problems mentioned above by means of applying a high humidity hot wind to a polished grain or a processed granular material so as to heat a surface layer portion, forming a starch in the heated portion into a paste state, making the starch into an alpha state, cooling the portion and forming a fine layer of the alpha starch.

The method in accordance with the present invention is to apply the high humidity hot wind to the granular material such as the polished grain or the like so as to form the starch in the portion between some microns and some hundreds microns of the surface of the granular material into a paste state due to the heat and the moisture, further to make the starch into an alpha state so as to form the alpha starch layer having a fine density and a high abrasion resistance, and to cool the alpha starch layer.

A temperature and a humidity (moisture containing amount) of the high humidity hot wind and a heating time of the granular material are determined on the basis of a quality of the raw material granular material and a thickness (between some microns and some hundreds microns) of the alpha starch layer required for the product granular material.

That is, when applying the high humidity hot wind to the granular material, the starch of the surface portion is at first formed into a paste state, and next it is made into an alpha state.

In this case, the fine-powder-shaped starch attached to the surface of the granular material is also simultaneously formed into a paste state so as to be attached to the granular material, thereby being integral with the granular material.

The raw material granular material has a tendency that the surface portion is easily formed into a paste state as the contained moisture becomes higher, and the paste state and the alpha state of the starch of the surface portion of the granular material can be securely promoted as the heating time becomes longer, whereby the thickness of the alpha starch layer is increased.

In this case, when the temperature of the high humidity hot wind is over a fixed temperature, for example, 250° C., a speed at which the portion is dried becomes greater than a speed at which the starch is made into a paste state in accordance that the temperature becomes higher, whereby the alpha starch layer becomes thin.

Further, when the heating operation is continued after the alpha starch layer is generated, the alpha starch layer is dried, the density fineness is reduced to weaken the layer, and a crack is going to be generated on the surface of the granular material. In this case, when the heating operation is further continued, the heat is transmitted to an inner side of the alpha starch layer, the starch at this portion is made into an alpha state and the contained moisture is reduced, whereby the granular material becomes not "a raw rice".

Accordingly, in view of this point, the high humidity hot wind is to be properly set such that a temperature is about 85 to 300° C., a humidity is about 50% or more, and a heating time is about 1 to 10 seconds, and in the case that a temperature is about 200 to 300° C., the heating time is to be properly set to about 1 to 5 seconds.

After applying a predetermined heat treatment to the granular material, the treated granular material is cooled. This cooling operation is applied for the reason of preventing the alpha starch layer being weakened due to the continuous heat application after the pasted starch is made into an alpha state and preventing the granular material from being changed in quality due to the temperature transmission to the inner portion of the granular material. The cooling operation is performed by changing the temperature to a temperature (about 40 to 50° C. or less) at which the weakening and the change in quality are not generated before the weakening and the change in quality are generated (within about 1 to 10 seconds after the heating). The purpose can be achieved by bringing the alpha starch layer into contact with the air at a room temperature.

DESCRIPTION OF THE PREFERRED EMBODIMENT

Figure 1:
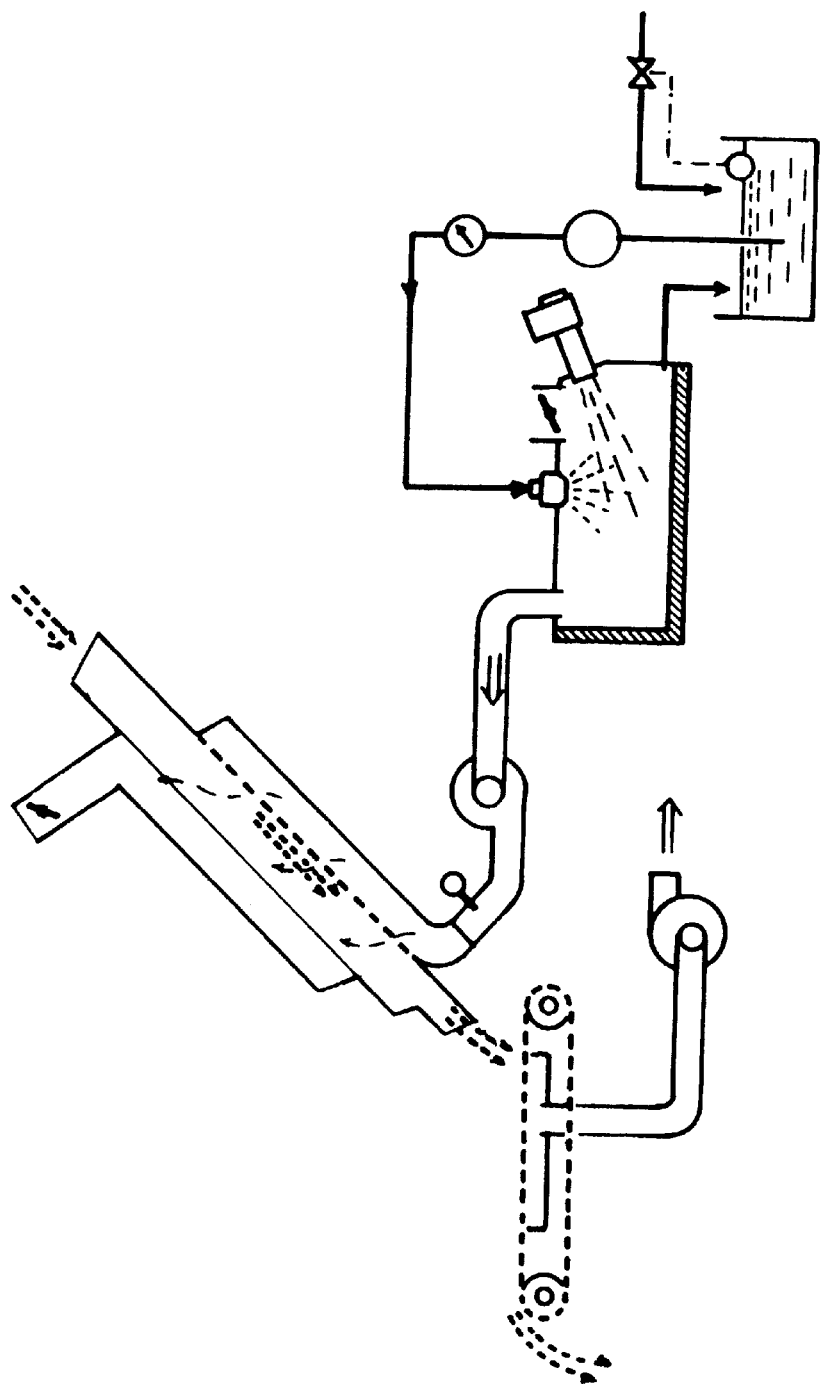
FIG. 1 is a side elevational view schematically showing an embodiment of a surface treating apparatus of a granular material to which a method in accordance with the present invention is applied.

A description will be particularly given below of a surface treating method of a granular material in accordance with the present invention on the basis of an illustrated surface treating apparatus.

In this embodiment, the surface treating apparatus of the granular material is constituted by a heating tank 1 and a cooling conveyor 2.

In the heating tank 1, an inlet port 11 for a raw material granular material is mounted at an upper portion and a discharge port 12 is mounted at a lower portion. Further, a sliding surface 13 formed by a metal net or a punched metal is provided between the both ports. Further, although an illustration is omitted, a fixed amount inputting apparatus of the raw material granular material is connected to the inlet port 11 so as to input the fixed amount of the raw material granular material into the heating tank 1, whereby the input raw material granular material is slid down while rolling along the sliding surface 13 and is discharged from the discharge port 12. A ventilating port 14 for a high humidity hot wind is mounted to a lower portion of the heating tank 1, an exhaust port 15 is mounted to the upper portion thereof, and a high humidity hot wind generating apparatus is connected to the ventilating port 14, whereby the structure is made such as to supply the high humidity hot wind having a predetermined temperature to the heating tank 1. The supplied high humidity hot wind passes through the sliding surface 13 within the heating tank 1 so as to be in contact with the granular material sliding thereon and heat the granular material, and thereafter is discharged from the discharge port 15. In other words, the granular material sliding on the sliding surface 13 is in contact with the high humidity hot wind so as to be heated, and thereafter is discharged from the discharge port 12.

The heating tank 1 is structured such that an angle of incline can be freely adjusted, whereby a time required for the granular material sliding on the sliding surface 13, that is, a time required for being heated and treated by the high humidity hot wind can be adjusted by adjusting the angle of incline of the heating tank 1 so as to adjust the angle of incline of the sliding surface 13.

In accordance with the embodiment shown in FIG. 1, the high humidity hot wind generating apparatus is of a type of supplying a combustion gas of a burner as one component of the high humidity hot wind to the heating tank 1, and is constituted by a mixing tank 3, a burner 4 and a spray nozzle 5. The spray nozzle 5 is provided at a position at which the flame injected from the burner 4 is not directly brought into contact with the spray nozzle 5 and a spray-like water injected therefrom is easily mixed with the flame of the burner 4, the spray-like water is mixed with the flame and the hot gas within the mixing tank 3 so as to be gasified and the inner portion of the tank is filled with the air having high humidity and high temperature.

In this case, the mixing tank 3 is structured such that an inner surface is covered by a heat resisting material so as to be protected and a part being in contact with the surface among the spray-like water injected from the spray nozzle 5 is easily gasified.

An air supply port 31 is formed at one end of the mixing tank 3, and a temperature, a humidity and a generating amount of the high humidity hot wind are adjusted by suitably adjusting a strength of the flame injected from the burner 4, an amount of air supplied to the mixing tank 3 from the air supply port 31 and an amount of water injected from the spray nozzle 5. In this case, the illustrated high humidity hot wind generating apparatus is structured such that an excessive water can be blown out from the spray nozzle 5 so as to make it easy to adjust the generating amount of steam within the mixing tank 3, and a service tank 8 is attached to the mixing tank 3 so as to receive an excessive high temperature moisture which is not gasified within the tank 3 and mix the moisture with a fresh water, thereby supplying to the spray nozzle 5. Accordingly, it is intended to efficiently utilize a thermal energy.

Further, an outlet duct 32 is connected to a proper portion in the mixing tank 3, the outlet duct 32 is connected to the inlet port 14 of the heating tank 1, and a heat resisting blower 33 is mounted in the middle thereof, whereby the high humidity air generated within the tank 3 is supplied to the heating tank 1 as the high humidity hot wind. In this case, in the illustrated embodiment, the structure is made such that a raw material water is stored in the service tank 8, a water supply pump 9, a flow amount meter 92 and the like are interposed between the service tank 8 and the spray nozzle 5, and a predetermined amount of water is injected from the nozzle 5 at a fixed pressure. A level sensor 82 is mounted to the service tank 8, and a control valve 81 is mounted to a water intake pipe 83, whereby a water level within the service tank 8 is kept at a fixed range by connecting the both members.

As the cooling conveyor 2, a net conveyor is used in this embodiment and provided below the discharge port 12 of the heating tank 1, so that the granular material treated in the heating tank 1 is dropped on the cooling conveyor 2 immediately after being discharged from the discharge port 12, and is in contact with the air within the room so as to be cooled. A suction duct 21 is mounted to a lower surface of the feeding surface of the cooling conveyor 2, and a suction blower 22 is connected to the suction duct 21, thereby generating an air stream from an upper surface of the feeding surface of the cooling conveyor 2 toward a lower portion so as to increased a cooling effect of the granular material and remove fine particles mixed in the granular material.

When supplying the raw material granular material to the heating tank 1, the granular material is at first brought into contact with the high humidity hot wind at an upper portion of the sliding surface 13. Since the granular material has a temperature lower than that of the high humidity hot wind, the temperature of the high humidity hot wind at first brought into contact with the granular material is slightly reduced, and the relative humidity thereof is increased at that degree. Accordingly, the granular material is in a state of being covered with the air rich in the contained moisture. Then, in the granular material, the starch on the surface layer portion is formed into a paste state due to the moisture of the air, the moisture contained in the granular material itself and the temperature while sliding on the sliding surface 13, and next the pasted starch is continuously made into an alpha state. At this time, the particulate starch closely attached to the raw material granular material is also formed into a paste state so as to be attached to the granular material, thereby being integral therewith so as to constitute a part of the granular material.

In the surface layer portion of the granular material, the starch is formed into a paste state and the dried state is promoted. Since the dried state is promoted faster as the temperature of the high humidity hot wind is higher, the moisture required for forming into a paste state is faster lost as the temperature of the high humidity hot wind is higher, whereby the promotion of the paste state is restricted and the pasted layer tends to be thin. Further, when the passing time within the heating tank 1 is long and the heating operation is further continued after being formed into a paste state, the pasted starch layer is dried so as to become porous and be weakened. A part inside the alpha starch layer of the granular material itself is made into an alpha state, is dried and generates a crack.

The granular material in which the starch on the surface portion is formed into a paste state so as to be made into an alpha state is temperature reduced immediately after being dropped on the cooling conveyor 2, and the starch layer is solidified, so that the alpha starch layer is formed.

Figure 2:
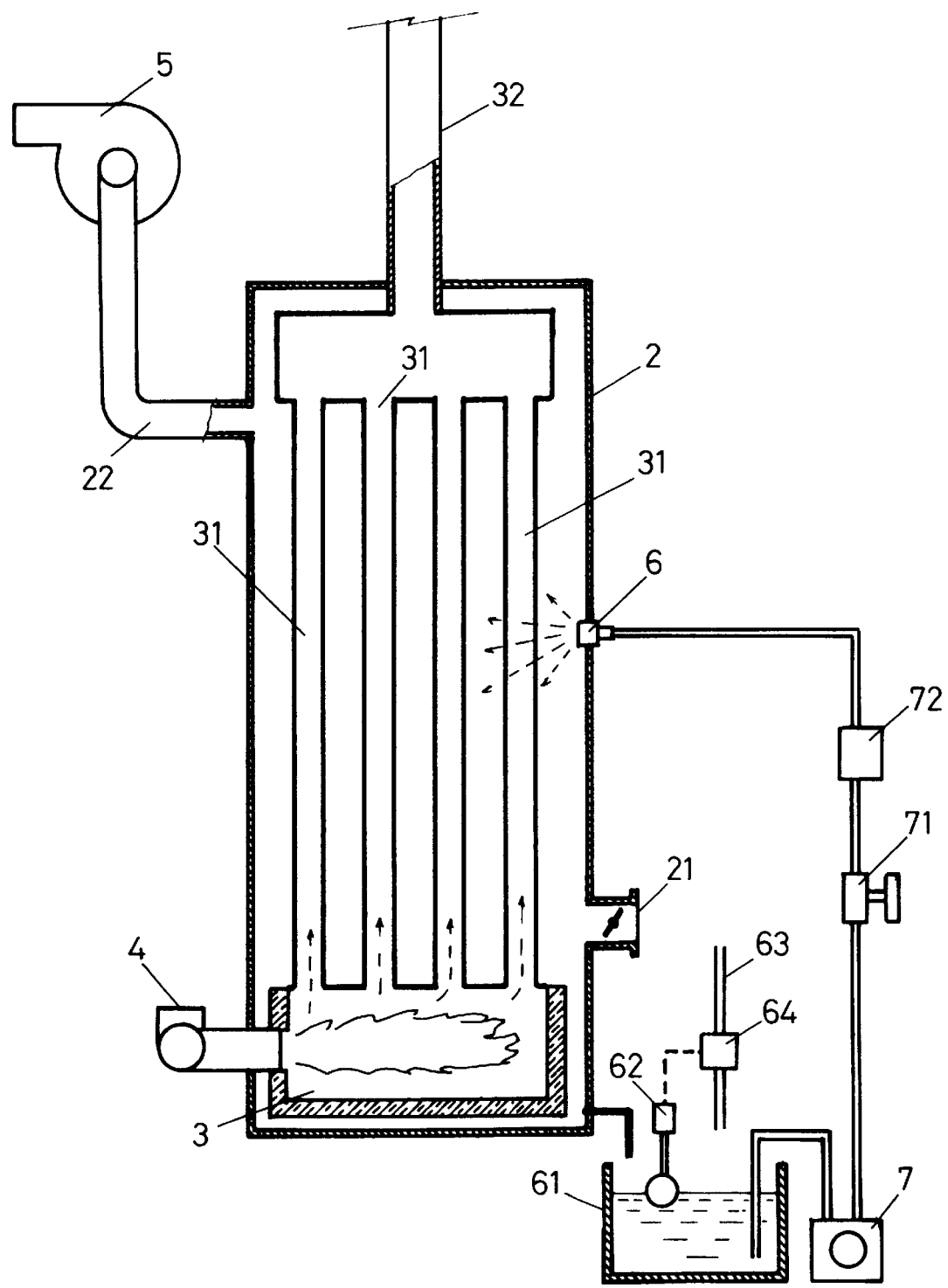
FIG. 2 is a partly cutaway vertical cross sectional view showing another embodiment of a high humidity hot wind generating furnace.

FIG. 2 shows a high humidity hot wind generating furnace in another type. The high humidity hot wind generating furnace is structured such as to indirectly heat an air due to a heat generated from the burner, thereby preventing a combustion gas of the burner from being supplied to the heating tank 1.

In FIG. 2, the high humidity hot wind generating furnace is provided with a combustion chamber 7 in a bottom portion within a main body 6, and the burner 4 is mounted thereto, thereby injecting the flame thereto. Further, a plurality of chimney pipes 71 are provided at a suitable interval, each of them is connected to the combustion chamber 7, and a hot gas generated in the combustion chamber 7 passes within the chimney pipes 71, ascends while exchanging heat with the air within the main body 6 and is discharged to the open air through a chimney 72 later. In this case, in the illustrated embodiment, the combustion chamber 7 is formed by using heat resisting bricks so as to resist against a high temperature.

An air supply port 61 is formed at a proper portion of the main body 6, and a hot wind supply duct 62 is mounted at another proper portion thereof. Further, a heat resisting blower 63 is connected to the hot wind supply duct 62. The air is sucked into the main body 6 from the supply port 61 by driving the heat resisting blower 63, and the sucked air is heated by the heat in the chimney pipes 71 so as to become a high temperature air and be taken out from the hot wind supply duct 62.

The spray nozzle 5 is mounted in the main body 6, and is structured such as to inject a suitable amount of water in a spray state into the main body therefrom. The water is mixed with the high temperature air flowing within the main body so as to be gasified, and the air becomes an air having a high humidity and a high temperature. In this case, in the illustrated embodiment, the structure is made such that the raw material water is stored in the service tank 8, and a predetermined amount of water is injected at a fixed pressure from the nozzle 5 through the water supply pump 9, a flow amount adjusting valve 91, a flow amount meter 92 and the like interposed between the service tank 8 and the spray nozzle 5. Further, it is intended to effectively utilize the heat by introducing a high temperature drain water discharged from the main body 6 to the service tank 8. A level sensor 82 is mounted to the service tank 8, and a control valve 81 is mounted to a water intake pipe 83, so that a water level within the service tank 8 is kept in a fixed range by communicating both the members.

When generating the air having a high humidity and a high temperature, the burner 5 is driven so as to inject the flame to the combustion chamber 7, thereby setting the chimney pipes 71 to a heated state. Then, the water supply pump 9 is driven as well as the heat resisting blower 63 is driven. Then, the air stream from the supply port 61 to the hot wind supply duct 62 is generated within the main body 6, is brought into contact with the chimney pipes 71 so as to be heated and become a high temperature air, and at the same time, a predetermined amount of water is injected from the spray nozzle 5 in a spray state and is mixed with the high temperature air so as to be gasified. Accordingly, the air becomes the air having a high humidity and a high temperature, and is fed to the heating tank 1 via the heat resisting blower 63 from the hot wind supply duct 62.

As mentioned above, the surface treating method of the granular material in accordance with the present invention is structured such as to apply the high humidity hot wind to the granular material so as to heat the portion in the thickness between some microns and some hundreds microns of the surface, thereby forming the starch into a paste state and further making it into an alpha state and cool the portion, so that the alpha starch layer having a fine density and a high abrasion resistance is formed in the surface portion of the granular material.

As a result, since no fine particles exist on the surface of the granular material and no fine pieces due to the abrasion during the treatment is generated, there is an advantage that these particles and pieces are not required to be washed at a time of cooking the rice. Further, since the surface portion of the granular material is constituted by the alpha starch layer, the oil and fat are prevented from being oozed out of the inner portion and the oxygen is prevented from being entered into the inner portion, so that the change in quality due to the oxidation of the oil and fat is not generated. Accordingly, it is possible to storage for a long time.

What is claimed is:

1. A surface treating method of a polished grain or a granular material obtained by kneading and solidifying a starch, comprising the steps of:

applying a high humidity hot wind at a temperature of 85 to 300° C. and at a humidity of more than 50% to said polished grain or granular material to heat a surface layer portion of said polished grain or granular material;

forming a starch in the heated portion into a paste state and making said starch into an alpha state; and cooling said surface layer portion to a temperature less than 50° C. within 1 to 10 seconds after heating to form a fine layer of the alpha starch in said surface layer portion.

* * * * *